UNITED STATES PATENT OFFICE.

SAMUEL SANBORN, SAN FRANCISCO, CALIFORNIA.

FOOD FOR CALVES.

SPECIFICATION forming part of Letters Patent No. 317,021, dated May 5, 1885.

Application filed May 12, 1884. (No specimens.)

*To all whom it may concern:*

Be it known that I, SAMUEL SANBORN, of the city of San Francisco, in the county of San Francisco and State of California, have invented an Improvement in Artificial Food for Calves; and I hereby declare the following to be a full, clear, and exact description thereof.

My invention relates to a preparation which is to be used as a food for calves and young animals in the place of or as a substitute for milk; and it consists of a combination of ingredients which are nutritious and not hurtful to the animal. These ingredients are mainly sugar, oatmeal, salt, phosphate of lime, phosphate of sodium, and soda. In connection with the above a small quantity of biborate of soda, sulphite of lime, and nitrate of potash may be used as a preservative. A very suitable proportion of these ingredients may be about as follows, subject to slight variation, according to the age and condition of the animal: sugar, nine pounds; salt, two pounds, five and a half ounces; phosphate of sodium, one pound; phosphate of lime, eight ounces; soda, ($Na_2O$,) six drams; oatmeal, thirty-three pounds. The sugar, salt, soda, and phosphates of lime and sodium are to be mixed with sufficient water to dissolve them, after which they are to be diluted with water until the whole amounts to about one hundred gallons; then add the oatmeal and boil for a few minutes.

When it is desired to keep the above ready mixed for several days, add about five or six ounces each of biborate of soda, nitrate of potash, and sulphite of lime.

When this preparation is used for very young calves, it should be mixed with an equal quantity of milk, and as the animal advances in age the milk may be gradually diminished.

Having thus described my invention, what I claim as new, and desire to secure by Letters Patent, is—

A food preparation for calves and young animals, consisting of sugar, oatmeal, salt, soda, and phosphates of lime and of sodium, in the proportions substantially as herein described.

In witness whereof I have hereunto set my hand.

SAMUEL SANBORN.

Witnesses:
S. H. NOURSE,
H. C. LEE.